US006000946A

United States Patent [19]

Snyders et al.

[11] Patent Number: 6,000,946

[45] Date of Patent: Dec. 14, 1999

[54] COLLABORATIVE DRAWING DEVICE

[75] Inventors: Lawrence M. Snyders; Jeffrey L. Multhaup, both of Boise, Id.

[73] Assignee: Hewlett-Packard Company, Palo Alto, Calif.

[21] Appl. No.: 09/037,211

[22] Filed: Mar. 9, 1998

[51] Int. Cl.[6] .......................... G09B 25/00; G09B 11/00; G09B 19/18; B43L 1/00

[52] U.S. Cl. ............................ 434/365; 434/81; 434/107; 434/402; 434/412; 434/416; 434/426; 434/427; 434/428; 434/430; 707/541

[58] Field of Search ................................ 434/81, 84, 85, 434/98, 101, 107, 365, 402, 404, 405, 408–414, 416, 425, 426, 427, 428, 430; 707/541

[56] References Cited

U.S. PATENT DOCUMENTS

| | | | |
|---|---|---|---|
| 4,464,118 | 8/1984 | Scott et al. | 434/85 |
| 4,797,106 | 1/1989 | Umehara et al. | 434/408 |
| 4,797,107 | 1/1989 | Hatta et al. | 434/408 |
| 4,887,968 | 12/1989 | Wickstead et al. | 434/85 |
| 5,442,859 | 8/1995 | Naumann | 33/18.1 |
| 5,528,290 | 6/1996 | Saund | 348/218 |
| 5,711,523 | 1/1998 | Sternberg et al. | 273/153 R |
| 5,737,740 | 4/1998 | Henderson et al. | 707/530 |

FOREIGN PATENT DOCUMENTS

| | | | |
|---|---|---|---|
| 6-168289 | 6/1994 | Japan | G06F 15/60 |

*Primary Examiner*—Robert A. Hafer
*Assistant Examiner*—John Edmund Rovnak

[57] ABSTRACT

Described herein is a collaborative drawing device having a support surface configured to support a drawing medium for drawing thereupon by a human user. The drawing device includes a printer that prints prepared graphics on the drawing medium and a scanner that scans documents that have been printed, drawn by hand, and annotated by hand.

20 Claims, 3 Drawing Sheets

COLLABORATIVE DRAWING DEVICE

FIELD OF THE INVENTION

The invention relates to drawing devices such as chalkboards and whiteboards that are used for sketching ideas and concepts in a group environment.

BACKGROUND OF THE INVENTION

Chalkboards have been used for generations in schoolrooms and other learning environments. More recently, so-called "whiteboards" have become popular in the same environments. A whiteboard consists of a large white surface which can be drawn upon with erasable markers. Such erasable markers or pens are available in a number of colors. A whiteboard is generally easier to write on than a chalkboard and is also easier to erase. Furthermore, drawings on a whiteboard are usually easier to see than drawings on a chalkboard.

Although chalkboards have traditionally been used in classrooms, whiteboards have become popular in a number of business environments. For instance, whiteboards are often located in the offices of corporate employees. In this environment, whiteboards are used for notes, lists, and as an aid to visualizing concepts.

In addition, whiteboards are often used to facilitate group discussions and idea generating sessions, in both individual offices and in larger settings such as conference or meeting rooms. When the whiteboard is used for this purpose, an individual typically sketches ideas on the whiteboard while discussing the ideas with other individuals. Others might add to the discussion and the sketch during the course of a meeting. Generally, the whiteboard serves to record and visualize the meeting discussions.

In many cases, the ideas and corresponding sketches generated during a meeting turn out to have some value, and the meeting participants therefore desire to record the whiteboard sketches and/or data. Depending on available time and energy, this can be accomplished by hand with different degrees of accuracy and completeness.

To avoid the need for manually copying whiteboard drawings, whiteboards are available with integrated reproduction capabilities. When a whiteboard drawing reaches a stage that needs to be recorded, a meeting participant pushes a button, and the device prints a reduced-size reproduction of the whiteboard drawing. This is an extremely valuable convenience. Panasonic brand models KX-520 and KX-530 are examples of whiteboard devices like this.

Although whiteboards such as these work well in conjunction with collaborative efforts, they are not as convenient in meetings where prepared presentations are made. In these meetings, presenters often use pre-drawn sketches or graphics; manually sketching such graphics on a whiteboard during a presentation would be awkward and distracting. Accordingly, such graphics are presented using pre-printed transparencies in conjunction with an overhead projector. More recently, laptop computers are used in conjunction with large-format video monitors or projection devices to present pre-prepared graphics. Such graphics are commonly referred to as "slides."

Some meetings, of course, involve both presentations and collaboration. Such meetings often involve various types of equipment to meet the needs of the various participants. For example, a meeting might start with a presentation made in conjunction with computer-generated slides. At some point, a more general discussion might begin and the focus shifts to a whiteboard. Often, it is necessary to start the whiteboard discussion with something that was previously shown on one of the computer-generated slides, requiring one of the participants to duplicate the slide with a pen on the whiteboard.

SUMMARY OF THE INVENTION

The invention includes a drawing board somewhat similar to a whiteboard. A writeable and erasable material such as transparent Mylar film is mounted on rolls for scrolling across a support surface under some type of automated control. A printhead is positioned at one side of the support surface to print pre-drawn images on the writeable material as the material scrolls beneath the printhead. A scanner or scanning head is positioned at the other side of the support surface to scan and digitize images as the writeable material scrolls beneath the scanning head.

In use, a presentation begins with a printed image on the transparent film. The printed image can originate from a remote computer or from memory of the drawing device itself, and is printed on the scrollable surface by the printhead. As the image is printed, it becomes visible on the support surface. During subsequent discussions, participants can manually add to the image using erasable pens. The participants can also erase portions of image, including pre-printed portions of the image. The image can be recorded at any time. When recording, the writeable material is scrolled beneath the scanning head and digitized. The resulting digitized image is either stored internally or transmitted to some other device such as a remote computer or a printer.

DETAILED DESCRIPTION OF THE INVENTION

Figure 1:
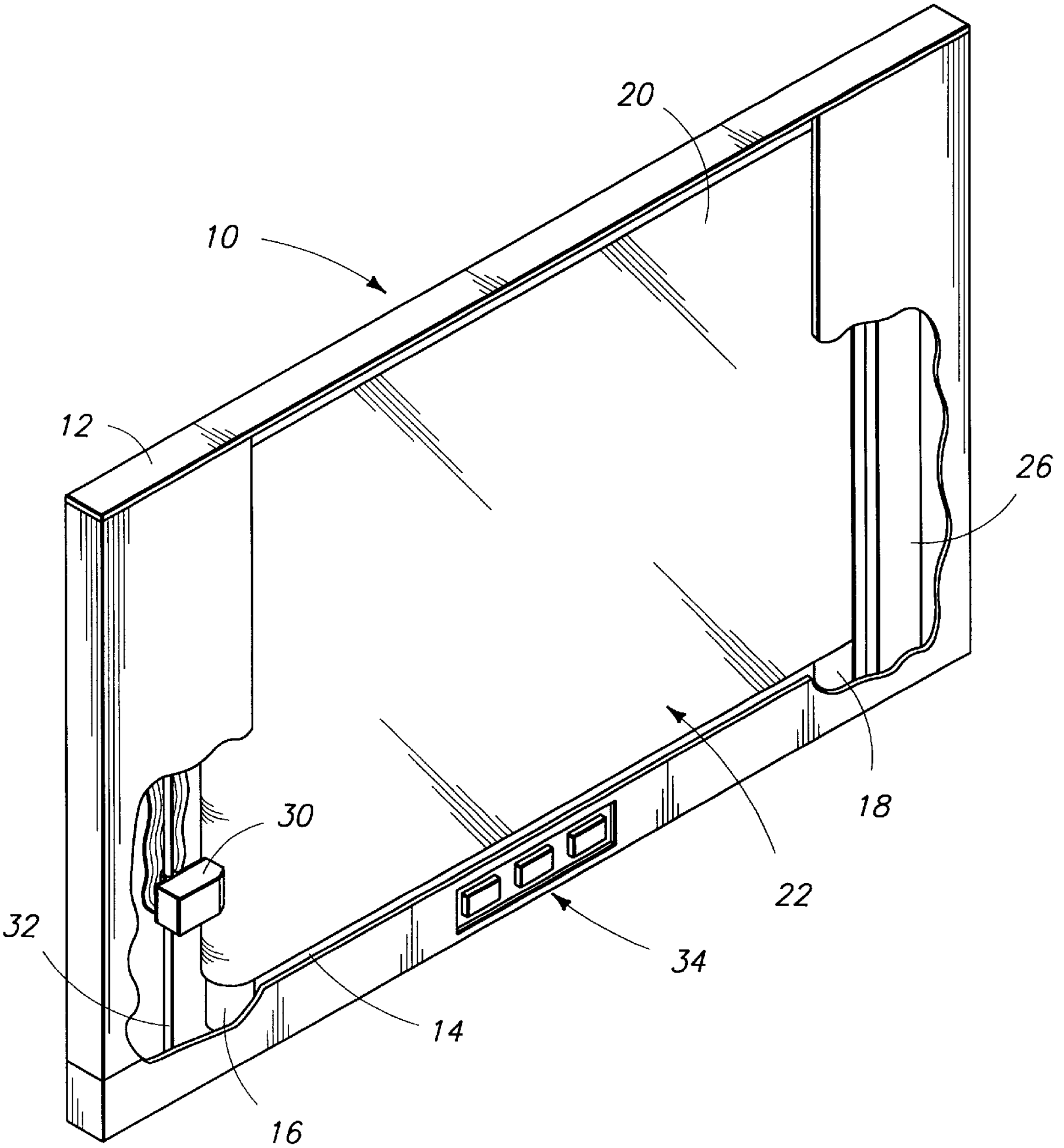
FIG. 1 is a front perspective view of a drawing device in accordance with the invention.

FIG. 1 shows a collaborative drawing device or board 10 in accordance with the invention. The drawing board has a housing 12 that forms a vertical and planar support surface 14. The support surface is positioned to support a drawing medium for drawing thereupon by a human user.

A supply roller 16 is positioned at the left-most side of the device, within the housing. A take-up roller 18 is positioned at the right-most side of the device within housing 12. Both rollers extend vertically and revolve about vertical axes that are parallel with planar support surface 14. Housing 12 is configured to cover the rollers and to hide them from view.

A sheet material such as clear or transparent Mylar film 20 extends between the two rollers 16 and 18 across support surface 14, through openings in housing 12. The transparent film forms a scrollable and viewable surface 22 directly over the support surface, in a convenient position to be drawn on by a human user. The surface formed by transparent film 20 is writeable, erasable, and reusable. Common whiteboard or "dry-erasable" pens can be used to write and draw on surface 22. Anything written or drawn with such pens can be erased with cloth or with erasers that are available specifically for use with dry-erasable pens.

Motors (not shown) are connected to rotate rollers 16 and 18 in response to electrical control signals, and to thereby scroll transparent film 20 across support surface 14. The motors are preferably stepper motors that are driven by sequences of electrical pulses so that the rollers can be moved at desired rates and positioned accurately. Alternatively, position feedback sensors can be utilized for rotation and position control of the rollers.

A color image scanner or scanning head 26 is positioned at the right-hand side of drawing board 10, within housing 12. The scanning head extends vertically over the transparent film adjacent take-up roller 18. The scanning head utilizes conventional scanning technology. Thus, it includes a light source with specific illumination frequencies and a series of light receptors such as CCDs that capture reflected light from a media surface. The scanning head is positioned to digitize any images that have been drawn or printed on the surface of transparent film 20 as the transparent film moves beneath the scanning head.

A color printer or printhead 30 is positioned at the left-hand side of drawing board 10, within housing 12. The printhead in one embodiment is a color inkjet printhead that moves up and down on a carriage rail 32 within housing 12. The printhead is configured to print on the surface of transparent film 20 adjacent supply roller 16. The transparent film 20 is moved to the right during printing to print an image across a width of the transparent film. In the described embodiment, the printhead is a color inkjet printhead.

A control panel 34 is positioned in housing 12 at the lower edge of support surface 14. The control panel has a number of keys or a small keypad, and an optional display panel for use by an operator when configuring and operating the drawing board.

Figure 2:
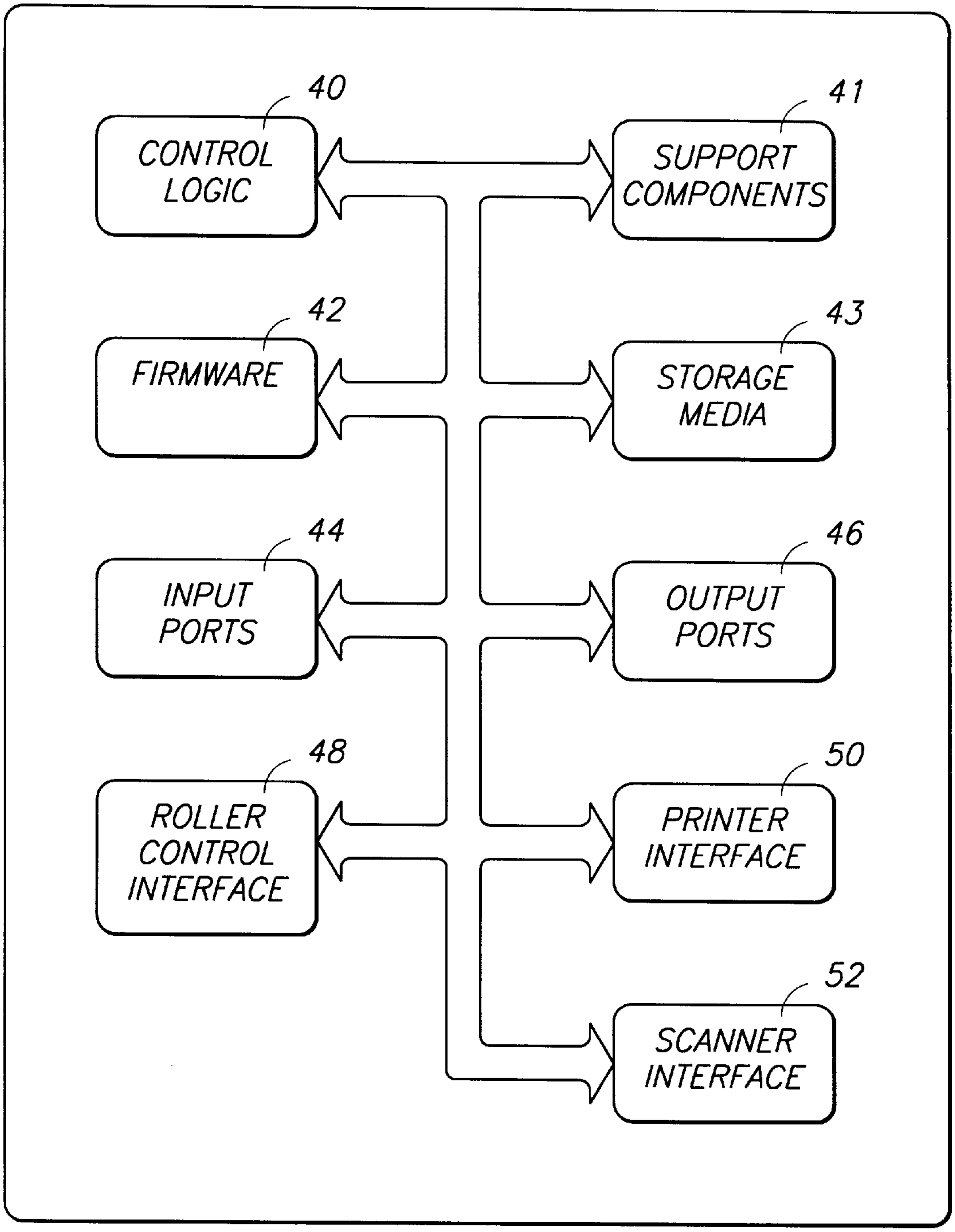
FIG. 2 is a block diagram showing pertinent control components of a drawing device in accordance with the invention.

FIG. 2 shows pertinent control components of drawing device 10. The control components are housed primarily behind control panel 34, within housing 12. These components include control logic 40, preferably in the form of a microprocessor, associated support components 41 (including memory and power circuits) and firmware 42. The printer and scanner are responsive to commands from control logic 40.

In addition, the control components include one or more digital storage media 43. Such storage media might comprise a hard disk or some other rotatable media, some form of non-volatile memory such as flash memory, or any one of a number of different types of storage devices. As described in more detail below, this digital storage is used to store digital images that are received from other components and that have been scanned from transparent film 20.

The control components of drawing device 10 also include one or more digital input ports 44 and one or more digital output ports 46. Such ports are implemented in various ways to facilitate the process of exchanging digitized images with other devices such as personal computers. For example, the ports can be serial ports implemented in accordance with the popular RS-232 standard. As another example, the ports can comprise Internet or Ethernet network ports. Other examples might utilize communications media such as infrared, RF, and telephone networks. Control logic 40 is programmed to implement communications protocols appropriate for the types of ports being used. In many embodiments, a single port will serve as both an input port and an output port.

The control components also include interface components for controlling the various hardware components of drawing device 10. Thus, control logic 40 controls the motors associated with rollers 16 and 18 through a roller controller interface 48. Control logic 40 controls printer 30 and scanner 26 through printer and scanner interfaces 50 and 52.

In the embodiment described herein, communications between printer 30, scanner 26, control logic 40, and external devices (through digital input and output ports 44 and 46) are implemented using "JetSend" technology developed by Hewlett-Packard Company. JetSend comprises firmware interposed between individual devices. Such firmware runs independently of operating systems and hardware, and transmits data—either images or text—without the need to know the configuration of the receiving hardware. More information regarding JetSend technology is available from Hewlett-Packard Company.

Control logic 40 is configured to provide low-level control of and coordination between the various electromechanical components of drawing device 10, such as printer 30, scanner 26, and rollers 16 and 18, although some of these low-level functions might be provided by dedicated controllers associated with the printer and/or the scanner. One low-level control function performed by control logic 40 is to coordinate scrolling of transparent film 20 with the printing and scanning performed by printer 30 and scanner 26.

In addition such low-level control functions, the control logic 40 of drawing device 10 implements a variety of features that make drawing device 10 easy and convenient to use. Most basically, the control logic is configured to receive an image from an external device such as a computer (through an input port 44), to print the image on transparent film 20 while scrolling the film to the right, to digitize or scan an image in response to a user command, and to send or transmit the digitized image to an external device such as a computer (through an output port 46).

Additional capabilities are implemented in the described embodiment of the invention. Most notably, the drawing device uses digital storage media 43 to store images, including both images that are scanned and images that are received from other sources. The digital storage medium preferably has enough capacity so that it can concurrently store multiple images. As an example illustrating the use of this feature, a user might send an image to the drawing device from a personal computer and print the image on the transparent film. The image would then be used during a group discussion, during which various annotations would be made by hand on the printed image. At some point during the discussion, the user would command the drawing device to scan or digitize the marked-up image and save it on digital storage media 43. An appropriate user interface is provided for allowing the user to command these functions and for prompting the user for an appropriate designator (such as a filename or number) for indexing any stored images. During later discussions, the image can be recalled and printed again for further annotations. Alternatively, the image can be sent to another device such as an external computer.

Thus, control logic 40 is configured to receive images from the input ports and the images scanner, to print any such images selected by a user, to scan and store multiple images from the input ports and from the image scanner, and to transmit selected ones of the scanned and stored multiple images in response to user commands.

In addition, control logic 40 is configured to track images that have been previously printed on the drawing medium. For example, if five images have been printed, the control logic keeps track of each image and its position on transparent film 20. In response to a user command, the control logic can reposition the transparent film to any one of the previously printed images by simply scrolling the film.

As an improvement to the device described above, the inkjet printer can be configured to use a dry-erasable ink such as used in common whiteboard markers. This allows meeting participants to not only mark up printed graphics, but to erase portions of them as well. Markups are preferably made with dry erasable markers to allow further flexibility.

Figure 3:
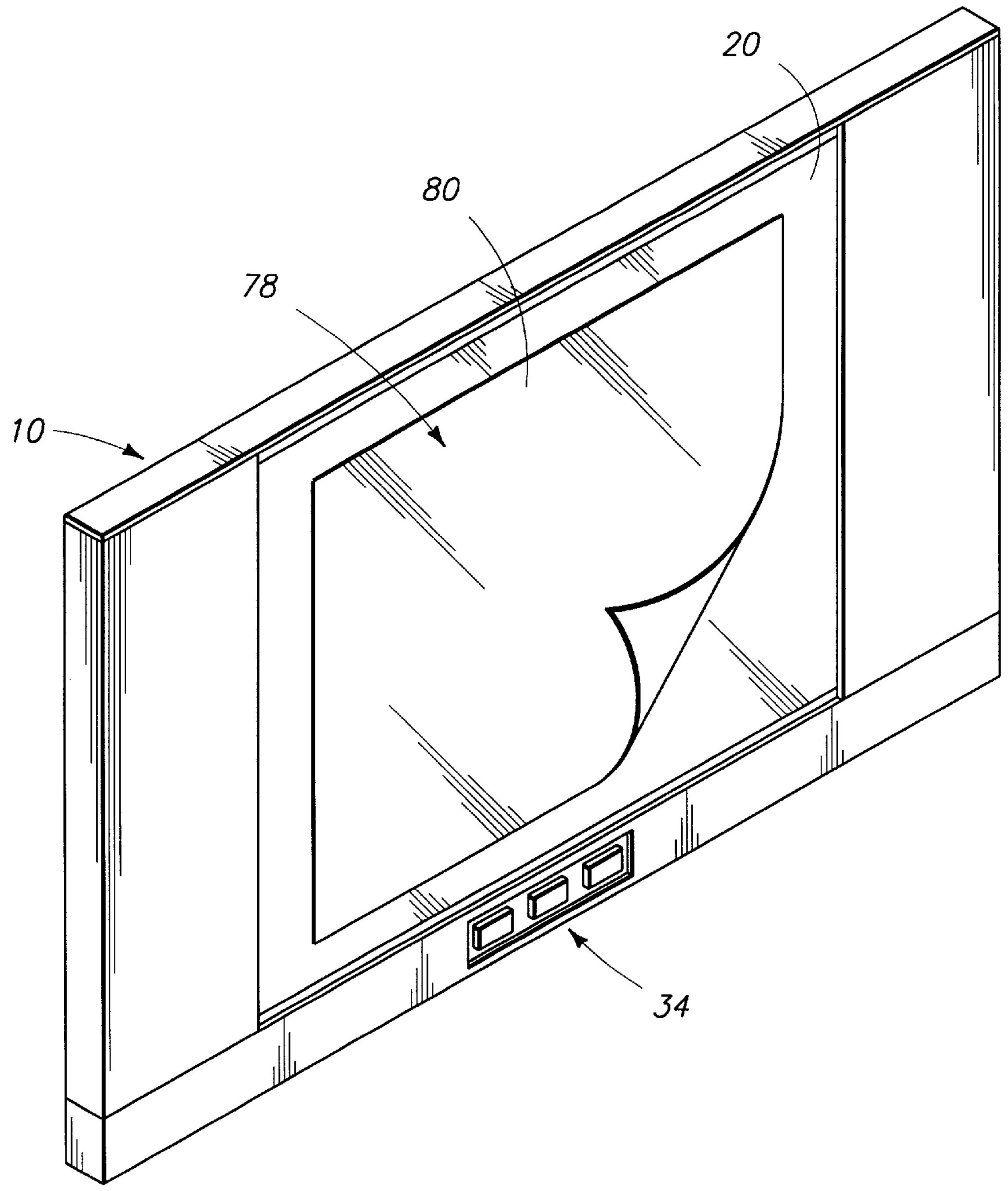
FIG. 3 is a front perspective view of the drawing device of FIG. 1, illustrating an optional aspect of the invention.

FIG. 3 shows a further feature that is optionally used in conjunction with the drawing device described above. In accordance with this aspect of the invention, a viewable printing and drawing surface 78 is formed by a sheet material 80 that is removably attached to the underlying scrollable sheet material. As an example, the sheet material 80 can be paper with self-stick adhesive on its rear side for adhesion to the transparent film 20. This allows drawing device 10 to be used as a printer, for printing paper or other materials that are subsequently removed and used independently of the drawing device.

The device described above provides a great degree of flexibility in conducting group meetings. Graphics or slides can be prepared ahead of time and then presented on the drawing device at the meeting. The images can be marked up during a presentation or during subsequent discussions. The user can scroll forward or backward in the slides and can scan and save any or all of the slides at any time. The marked-up slides can then be printed, emailed, or distributed in some other fashion. In addition, the marked up slides can be used as the starting point in further discussions, at a later date.

In addition to the uses described above, the device can be used as a display device that can dynamically or automatically update a viewed image. In an embodiment designed for this purpose, support surface 14 is covered by glass or plexiglass. An embodiment such as this can be used for public advertising or information display, resulting in an image that can be viewed in most indoors and outdoors lighting conditions.

The invention has been described in language specific to structural features and/or methodological steps. It is to be understood, however, that the invention defined in the appended claims is not necessarily limited to the specific features or steps described above. Rather, the specific features and steps are disclosed as exemplary forms of implementing the claimed invention.

What is claimed is:

1. A collaborative drawing device, comprising:

a viewable surface positioned to be drawn on by a human user;

a printer configured to print on the viewable drawing surface;

an image scanner configured to digitize images that have been drawn and printed on the viewable surface.

2. A collaborative drawing device as recited in claim 1, further comprising one or more storage media that store the digitized images.

3. A collaborative drawing device as recited in claim 1, wherein the viewable surface comprises a scrollable sheet material.

4. A collaborative drawing device as recited in claim 1, wherein the viewable surface comprises a sheet material that is removeably attached to a scrollable sheet material.

5. A collaborative drawing device as recited in claim 1, further comprising input/output ports for exchanging digitized images with other devices.

6. A drawing device, comprising:

a support surface positioned to support a drawing medium for drawing thereupon by a human user;

a printer configured to print on the drawing medium;

one or more digital input ports configured to receive images from other devices to print on the drawing medium with the printer;

an image scanner configured to digitize images that have been printed on the drawing medium with the printer and that have been drawn on the drawing medium by a human user;

one or more digital output ports configured to transmit the digitized images to other devices.

7. A drawing device as recited in claim 6, further comprising a support surface, wherein the drawing medium scrolls across the support surface.

8. A drawing device as recited in claim 6, further comprising:

a support surface;

a sheet material arranged to scroll across the support surface;

wherein the drawing medium is removeably affixed to the sheet material.

9. A collaborative drawing device, comprising:

a support surface positioned to support a drawing medium for drawing thereupon by a human user;

control logic;

a printer that is responsive to the control logic to print on the drawing medium;

an image scanner that is responsive to the control logic to digitize images that have been drawn and printed on the drawing medium;

one or more digital input ports;

one or more digital output ports;

the control logic being configured to receive images from other devices through the one or more input ports and to print said received images on the drawing medium using the printer;

the control logic being further configured to digitize images from the drawing medium using the image scanner, and to transmit said digitized images to other devices through said one or more output ports.

10. A collaborative drawing device as recited in claim 9, further comprising one or more digital storage media, the control logic being configured to store digitized images from the input ports on the one or more digital storage media.

11. A collaborative drawing device as recited in claim 9, further comprising one or more digital storage media, the control logic being configured to store digitized images from the image scanner on the one or more digital storage media.

12. A collaborative drawing device as recited in claim 9, further comprising one or more digital storage media, the control logic being configured to store digitized images from the input ports and from the image scanner on the one or more digital storage media.

13. A collaborative drawing device as recited in claim 9, wherein the control logic is configured to store multiple images and to print and transmit selected ones of the multiple images in response to commands from a human user.

14. A collaborative drawing device as recited in claim 9, wherein the control logic is configured to store multiple images from the input ports and from the image scanner and to print and transmit selected ones of the multiple images in response to commands from a human user.

15. A collaborative drawing device as recited in claim 9, wherein the control logic is configured to control scrolling of the drawing medium, the control logic being further configured to track images that have been previously been printed on the drawing medium and to reposition the drawing medium to a selected one of said previously printed images.

16. A collaborative drawing device as recited in claim 9, wherein the control logic is configured to print an image and to then digitize a marked-up version of the image.

17. A collaborative drawing device as recited in claim 9, wherein the control logic is configured to print an image, to digitize a marked-up version of the image, to save the digitized marked-up version of the image, and to later print the digitized marked-up version of the image.

18. A collaborative drawing device as recited in claim 9, wherein the control logic is configured to print an image, to digitize a marked-up version of the image, and to send the digitized marked-up version of the image to another device.

19. A collaborative drawing device as recited in claim 9, wherein the control logic is configured to receive an image, to print the received image, and to digitize a marked-up version of the received image.

20. A collaborative drawing device as recited in claim 9, wherein the control logic is configured to receive an image, to print the received image, to digitize a marked-up version of the received image, and to send the digitized marked-up version of the received image to another device.

* * * * *